United States Patent
Barlev

(10) Patent No.: US 9,749,921 B2
(45) Date of Patent: Aug. 29, 2017

(54) SYSTEM AND METHOD FOR INTERROGATING A MOBILE COMMUNICATION TERMINAL

(71) Applicant: Verint Systems Ltd., Herzliya Pituach (IL)

(72) Inventor: Ishay Barlev, Limassol (CY)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 0 days.

(21) Appl. No.: 15/294,257

(22) Filed: Oct. 14, 2016

(65) Prior Publication Data

US 2017/0111836 A1     Apr. 20, 2017

(30) Foreign Application Priority Data

Oct. 15, 2015   (IL) .......................................... 242119

(51) Int. Cl.
*H04W 36/14*     (2009.01)
*H04W 60/00*     (2009.01)
*H04W 48/18*     (2009.01)

(52) U.S. Cl.
CPC ........... *H04W 36/14* (2013.01); *H04W 48/18* (2013.01); *H04W 60/00* (2013.01)

(58) Field of Classification Search
CPC . H04W 12/02; H04W 72/0406; H04W 12/00; H04W 4/021; H04W 76/02;
(Continued)

(56) References Cited

U.S. PATENT DOCUMENTS

2006/0197702 A1*  9/2006  Jones .................. H04L 63/1416
                                                           342/126
2015/0350914 A1* 12/2015  Baxley .................. H04W 12/08
                                                           726/11
(Continued)

FOREIGN PATENT DOCUMENTS

WO     2010/116292      10/2010

OTHER PUBLICATIONS

Professor Joseph Ooi teaches IMSI Catchers and Mobile Security School of Engineering and Applied Science University of Pennsylvania Apr. 29, 2015.*

(Continued)

*Primary Examiner* — Nizar Sivji
(74) *Attorney, Agent, or Firm* — Meunier Carlin & Curfman

(57) ABSTRACT

Systems and methods to instruct a mobile device to switch from a first protocol to a second protocol after registering the device on a network associated with the first protocol. This may be done to obtain a cryptographic key used by the device. For example, for some communication protocols, such as 3G and 4G communication protocols, obtaining the cryptographic key is difficult. However, the 2G communication protocol uses a cryptographic key that is easier to obtain. Only after obtaining the key, the phone instructed to again switch to the first communication protocol. During the exchange of communication, the user is likely to be holding the phone at his ear, such that he is unlikely to notice that the phone is using the first communication protocol. Hence, the exchange of communication may be decrypted and monitored, without the user noticing anything amiss.

19 Claims, 2 Drawing Sheets

(58) Field of Classification Search
CPC ... H04W 16/14; H04W 64/00; H04W 84/045; H04W 8/16; H04L 63/0823; H04L 63/1425; H04L 63/1466; H04L 63/062; H04L 9/3226; H04L 9/3281; H04L 63/0457; H04L 9/3242; H04L 43/10; H04L 63/108; H04L 67/22; H04L 9/0822; H04L 9/3278; G06F 2221/2131; H04B 10/85

See application file for complete search history.

(56) References Cited

U.S. PATENT DOCUMENTS

| | | | |
|---|---|---|---|
| 2016/0323746 A1* | 11/2016 | Milchtaich | H04L 63/1425 |
| 2016/0381545 A1* | 12/2016 | Wang | H04W 12/00 455/434 |

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

Asokan, N., et al., "Man-in-the-Middle in Tunneled Authentication Protocols," Draft version 1.3 (latest public version: http://eprint.iacr.org/2002/163/, Nov. 11, 2002, 15 pages.

"Cell Scanning and Catcher Detection in unnoticeable pocket size," NetHawk C2, Data sheet, version 1.4, EXFO, 2010, 4 pages.

Kostrzewa, A., "Development of a man in the middle attack on the GSM Um-Interface," Master Thesis, 2011, 88 pages.

Girardin, F., et al., "Detecting air travel to survey passengers on a worldwide scale," Journal of Location Based Services, 2010, 26 pages.

Meyer, U., et al., "On the Impact of GSM Encryption and Man-in-the-Middle Attacks on the Security of Interoperating GSM/UMTS Networks," proceedings of the 15$^{th}$ IEEE International Symposium on Personal, Indoor and Mobile Radio Communications, 2004, pp. 2876-2883.

Strobel, D., "IMSI Catcher," Seminararbeit, Ruhr-Universität Bochum, 2007, pp. 13-24.

Vedaldi, A., "An implementation of SIFT detector and descriptor," University of California at Los Angeles, 2007, 7 pages.

* cited by examiner

SYSTEM AND METHOD FOR INTERROGATING A MOBILE COMMUNICATION TERMINAL

FIELD OF THE DISCLOSURE

The present disclosure relates generally to interrogating mobile communication terminals, such as mobile phones, and particularly to methods and systems for decrypting communication exchanged with such terminals.

BACKGROUND OF THE DISCLOSURE

In some cases, security and/or law enforcement agencies may wish to decrypt communication exchanged with a mobile communication terminal.

SUMMARY OF THE DISCLOSURE

There is provided, in accordance with some embodiments described herein, a method for intermediating an exchange of communication. A mobile communication terminal, which is associated with a first mobile communication network in accordance with a first communication protocol, is solicited to associate with an interrogation device. While the solicited mobile communication terminal is associated with the interrogation device, the mobile communication terminal is instructed to use a second communication protocol. Subsequently, the mobile communication terminal is registered on a second mobile communication network that uses the second communication protocol. Subsequently, the mobile communication terminal is instructed to again use the first communication protocol. Subsequently, by virtue of having registered the mobile communication terminal on the second communication network, a request for an exchange of second-communication-protocol communication with the mobile communication terminal is detected. In response thereto, the mobile communication terminal is instructed to use the second communication protocol for the exchange, and subsequently, the exchange is intermediated.

In some embodiments, intermediating the exchange includes decrypting the exchange.

In some embodiments, the method further includes, following the intermediating of the exchange, instructing the mobile communication terminal to re-associate with the first mobile communication network.

In some embodiments, instructing the mobile communication terminal to use the second communication protocol includes instructing the mobile communication terminal to use a second generation (2G) communication protocol.

In some embodiments, detecting the request for the exchange of communication includes detecting a request that is made by the mobile communication terminal.

In some embodiments, detecting the request for the exchange of communication includes detecting a request that is made by a communication terminal that is not the mobile communication terminal.

There is further provided, in accordance with some embodiments described herein, an interrogation device including an antenna, at least one transmitter-receiver (transceiver), and a processor. The processor is configured to, via the transceiver and the antenna, solicit a mobile communication terminal, which is associated with a first mobile communication network in accordance with a first communication protocol, to associate with the interrogation device via the transceiver and the antenna. The processor is further configured to, while the solicited mobile communication terminal is associated with the interrogation device, (i) instruct the mobile communication terminal to use a second communication protocol, (ii) subsequently, register the mobile communication terminal on a second mobile communication network that uses the second communication protocol, (iii) subsequently, instruct the mobile communication terminal to again use the first communication protocol, (iv) subsequently, by virtue of having registered the mobile communication terminal on the second mobile communication network, detect a request for an exchange of second-communication-protocol communication with the mobile communication terminal, (v) in response thereto, instruct the mobile communication terminal to use the second communication protocol for the exchange, and (vi) subsequently, intermediate the exchange.

In some embodiments, the processor is configured to decrypt the exchange while intermediating the exchange.

In some embodiments, the processor is further configured to, following the intermediating of the exchange, instruct the mobile communication terminal to re-associate with the first mobile communication network.

In some embodiments, the second communication protocol is a second generation (2G) communication protocol, the processor being configured to instruct the mobile communication terminal to use the 2G communication protocol.

In some embodiments, the processor is configured to detect the request by detecting a request that is made by the mobile communication terminal.

In some embodiments, the processor is configured to detect the request by detecting a request that is made by a communication terminal that is not the mobile communication terminal.

There is further provided, in accordance with some embodiments described herein, a computer software product including a tangible non-transitory computer-readable medium in which program instructions are stored. The instructions, when read by a processor of an interrogation device with which a mobile communication terminal, which was previously associated with a first mobile communication network in accordance with a first communication protocol, is associated, cause the processor to, via an antenna and a transmitter-receiver (transceiver) of the interrogation device, (i) instruct the mobile communication terminal to use a second communication protocol, (ii) subsequently, register the mobile communication terminal on a second mobile communication network that uses the second communication protocol, (iii) subsequently, instruct the mobile communication terminal to again use the first communication protocol, (iv) subsequently, by virtue of having registered the mobile communication terminal on the second communication network, detect a request for an exchange of second-communication-protocol communication with the mobile communication terminal, (v) in response thereto, instruct the mobile communication terminal to use the second communication protocol for the exchange, and (vi) subsequently, intermediate the exchange.

In some embodiments, the instructions further cause the processor to, prior to instructing the mobile communication terminal to use the second communication protocol, solicit the mobile communication terminal to associate with the interrogation device.

In some embodiments, the instructions cause the processor to, while intermediating the exchange, decrypt the exchange.

In some embodiments, the instructions further cause the processor to, following the intermediating of the exchange, instruct the mobile communication terminal to re-associate with the first mobile communication network.

In some embodiments, the instructions cause the processor to instruct the mobile communication terminal to use the second communication protocol by instructing the mobile communication terminal to use a second generation (2G) communication protocol.

In some embodiments, the instructions cause the processor to detect the request for the exchange of communication by detecting a request that is made by the mobile communication terminal.

In some embodiments, the instructions cause the processor to detect the request for the exchange of communication by detecting a request that is made by a communication terminal that is not the mobile communication terminal.

The present disclosure will be more fully understood from the following detailed description of embodiments thereof, taken together with the drawings, in which:

DETAILED DESCRIPTION OF EMBODIMENTS

Overview

Figure 1:
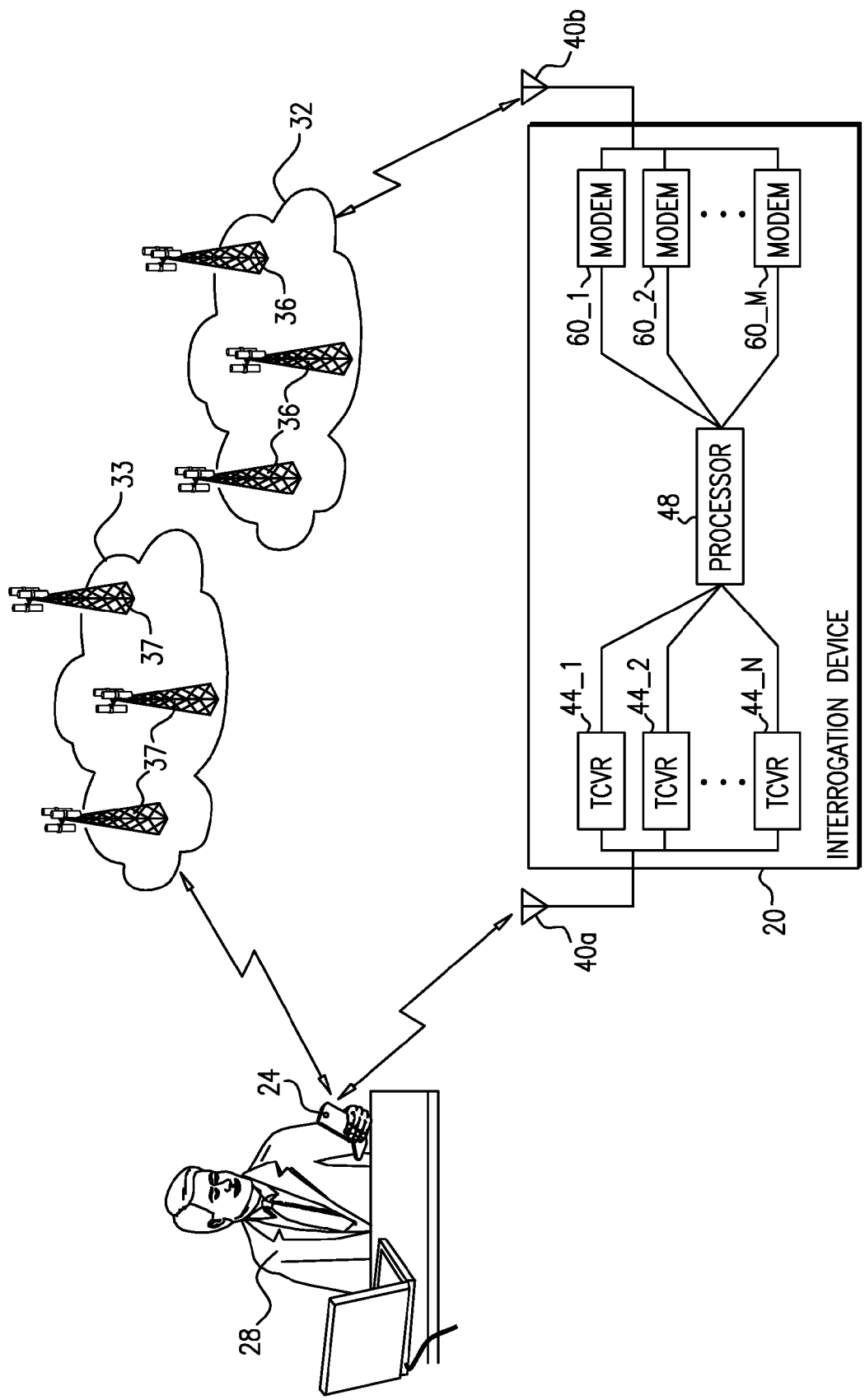
FIG. 1 is a schematic illustration of an interrogation device for interrogating a mobile phone, in accordance with some embodiments that are described herein.

A mobile communication terminal is a mobile device, such as a mobile phone (e.g., a "smartphone") or handheld computer that is used, inter alia for wireless communication. Although, for ease of description, the present description generally uses the term "mobile phone," it is noted that methods and apparatus described herein may be practiced and used with any type of mobile communication terminal.

Mobile communication terminals, such as mobile phones, may use various communication protocols for wireless communication. In general, the communication protocol that is used by a communication terminal for a particular communication session is determined by the mobile communication network with which the communication terminal is associated during the session. Thus, for example, while a phone is associated with a third generation (3G) communication network, the phone uses a 3G communication protocol.

A communication terminal may associate itself with a particular communication network in response to the strength or quality of a signal received from a base station belonging to the network, in response to predefined priorities among networks, and/or other considerations. For example, if a phone is relatively near a base station that belongs to a 3G communication network, the phone may receive a relatively strong signal from the base station, and, in response, associate itself with the 3G communication network.

Typically, a mobile communication terminal uses a ciphering algorithm, along with a cryptographic key, to encrypt communication to be transmitted from the terminal, and to decrypt communication received by the terminal. The ciphering algorithm is generally a feature of the communication protocol used by the terminal, while the cryptographic key is a parameter that is used as an input to the ciphering algorithm. Typically, each terminal has its own unique cryptographic key, such that, generally speaking, no two terminals encrypt communication in exactly the same way.

In some cases, security and/or law enforcement agencies may wish to decrypt communication exchanged with (i.e., transmitted to and/or from) a mobile phone. In order to do so, it is typically necessary to first obtain the cryptographic key used by the phone. However, for some communication protocols, such as the 3G and fourth generation (4G) communication protocols, the cryptographic key may be difficult to obtain. One solution is to instruct the phone to use a second communication protocol, such as a second generation (2G) communication protocol, that uses a cryptographic key that is easier to obtain. The phone may then be registered on a second network that uses the second communication protocol, and subsequent second-communication-protocol communication exchanged with the phone may then be decrypted. However, there is a risk that the user of the phone will notice that his phone has been switched to the second communication protocol, and is now registered on the second network. For example, the user may notice an indicator displayed on the phone that indicates that the phone is using the second communication protocol.

Embodiments that are described herein address the aforementioned challenge, by instructing the phone to switch back to the first communication protocol, after registering the phone on the second network. Only after detecting a request to exchange communication with the phone, is the phone instructed to again switch to the second communication protocol. During the exchange of communication, the user is likely to be holding the phone at his ear, such that he is unlikely to notice that the phone is using the second communication protocol. Hence, the exchange of communication may be decrypted and monitored, without the user noticing anything amiss.

Typically, an interrogation device performs the techniques described herein. The interrogation device first solicits the mobile phone by imitating the operation of a legitimate base station of the mobile communication network that serves the phone. For example, the interrogation device may transmit a signal at a relatively high power level and/or using directional antennas, such that the transmission from the interrogation device is received by the phone at a signal strength that is stronger than that of transmission from the mobile communication network with which the phone is normally associated. In response to receiving the higher-strength signal from the interrogation device, the mobile phone associates with the interrogation device, rather than with the mobile communication network. Alternatively, any other suitable method of solicitation may be used.

Interrogation devices that solicit mobile phones by imitating the operation of a legitimate base station are sometimes referred to as "IMSI catchers." Examples of IMSI catching techniques are described, for example, by Strobel in "IMSI Catcher," Jul. 13, 2007, which is incorporated herein by reference, by Asokan et al., in "Man-in-the-Middle Attacks in Tunneled Authentication protocols," the 2003 Security Protocols Workshop, Cambridge, UK, Apr. 2-4, 2003, which is incorporated herein by reference, and by Meyer and Wetzel in "On the Impact of GSM Encryption and Man-in-the-Middle Attacks on the Security of Interoperating GSM/UMTS Networks," proceedings of the 15th IEEE International Symposium on Personal, Indoor and Mobile Radio Communications, Barcelona, Spain, Sep. 5-8, 2004, pages 2876-2883, which is incorporated herein by reference.

System Description

Reference is initially made to FIG. 1, which is a schematic illustration of an interrogation device 20 for interrogating a mobile phone 24, in accordance with some embodiments described herein.

FIG. 1 shows a user 28 using a mobile phone 24. Under normal circumstances, mobile phone 24 is associated with a first mobile communication network 33, which may include, for example, a 3G network such as a Universal Mobile Telecommunication System (UMTS) network, a 4G network such as a Long-Term Evolution (LTE) network, or any other type of communication network. Network 33 includes one or more base stations 37, which facilitate communication to and from mobile phone 24. The communication protocol of network 33 is referred to herein as a "first communication protocol," such that mobile phone 24 is associated with network 33 in accordance with the first communication protocol. For example, the first communication protocol may be a 3G communication protocol such as UMTS, such that mobile phone 24 is associated with network 33 in accordance with the UMTS communication protocol, and base stations 37 are 3G (UMTS) base stations.

FIG. 1 also shows a second mobile communication network 32, which includes one or more base stations 36. (Some of base stations 36 may be co-located with respective base stations 37.) Second network 32 uses a second communication protocol that is "easier" to decrypt than the first communication protocol. For example, second network 32 may use a 2G communication protocol such as GSM, such that base stations 36 are 2G (GSM) base stations. As further described hereinbelow, interrogation device 20 causes phone 24 to associate with the interrogation device, and to then exchange second-communication-protocol communication with the interrogation device as if the phone were associated with second network 32.

In general, in the context of the claims and description of the present application, while a phone is "associated" with a network, all communication to and from the phone is generally transmitted directly via the network. Thus, for example, when user 28 uses phone 24 to communicate with another party, communication from phone 24 is transmitted to the other party, and communication to phone 24 is transmitted from the other party, via a base station belonging to the network, without any intermediating entity between the network and the phone. On the other hand, while a phone is associated with interrogation device 20, all communication to and from the phone is intermediated by the interrogation device. In other words, (i) from the perspective of the phone, the interrogation device mimics the behavior of a base station, and (ii) from the perspective of the network, the interrogation device mimics the behavior of the phone.

Interrogation device 20 comprises one or more transmitter-receivers (transceivers), and a first antenna 40a. Each of the transceivers, via first antenna 40a, may facilitate the solicitation of a communication terminal, and/or the ongoing association of the interrogation device with the communication terminal, by imitating the operation of a legitimate base station.

Typically, interrogation device 20 comprises a plurality of transceivers that use different respective frequencies, protocols, and/or other parameters for communication. For example, FIG. 1 shows N transceivers 44_1, 44_2, . . . 44_N. Such a plurality of transceivers allow the interrogation device to solicit a plurality of communication terminals, and/or remain associated with the plurality of communication terminals (e.g., simultaneously), regardless of the respective networks with which the communication terminals are normally associated. Furthermore, the plurality of transceivers may facilitate the association of the interrogation device with a communication terminal in accordance with more than one communication protocol. For example, a first transceiver 44_1 may communicate with phone 24 using a 3G protocol, by imitating the operation of a legitimate 3G base station 37 belonging to network 33. Subsequently, after the phone is instructed to switch to a 2G protocol (as further described below), a second transceiver 44_2 may communicate with phone 24 using the 2G protocol, by imitating the operation of a legitimate 2G base station 36 belonging to network 32.

Interrogation device 20 further comprises one or more modems, and, typically, a second antenna 40b. Each of the modems, via second antenna 40b, imitates (i.e., behaves as a clone of) a communication terminal in accordance with a particular communication protocol, such that communication may be exchanged between the relevant network and the modem as if the modem were actually the communication terminal. Hence, the interrogation device may intermediate an exchange of communication with a communication terminal, by one of the transceivers imitating a base station, while one of the modems imitates the communication terminal. For example, to intermediate (and hence, decrypt) a 2G communication exchange, one of the transceivers imitates a 2G base station 36 and communicates with the phone, while one of the modems imitates the phone and communicates with 2G network 32.

Typically, interrogation device 20 comprises a plurality of modems, such that the interrogation device may imitate, simultaneously, a plurality of communication terminals. For example, FIG. 1 shows a plurality of modems 60_1, 60_2, . . . 60_M.

Interrogation device 20 further comprises a processor 48. Processor 48 is configured to, via at least one of the transceivers and one of the modems, intermediate an exchange of second-communication-protocol communication with a mobile phone. While intermediating the exchange, the processor (i) decrypts communication received from the network via the modem, re-encrypts the communication, and transmits the re-encrypted communication to the phone via the transceiver, and (ii) decrypts communication received from the phone via the transceiver, re-encrypts the communication, and transmits the re-encrypted communication to the network via the modem. Thus, in intermediating the exchange of communication, the processor decrypts the communication exchanged with the phone. The decrypted communication may be monitored by an operator, stored for later analysis, exported to some external system, and/or handled in any other suitable way.

In some embodiments, the interrogation device is a mobile device. For example, the interrogation device may be carried in a suitcase.

Figure 2:
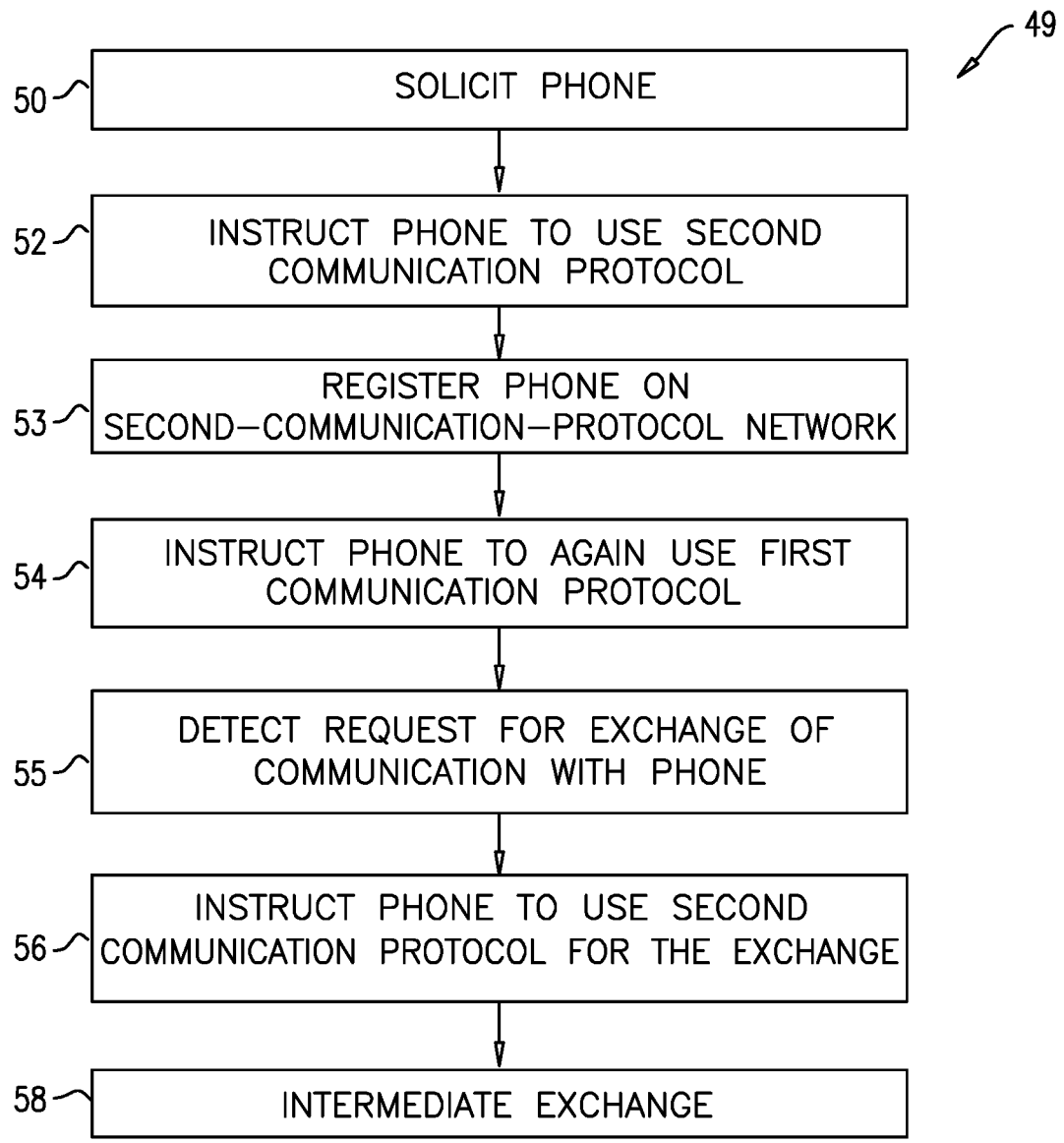
FIG. 2 is a flow diagram for a method for interrogating a mobile phone, in accordance with some embodiments that are described herein.

Reference is now additionally made to FIG. 2, which is a flow diagram for a method 49 for interrogating a mobile phone, in accordance with some embodiments described herein.

First, at a soliciting step 50, processor 48 solicits mobile phone 24, as described hereinabove, via one of the transceivers and first antenna 40a. For example, if the phone is associated with network 33 in accordance with a 3G protocol, processor 48 may instruct first transceiver 44_1 to transmit a relatively high-power soliciting signal via first antenna 40a, using the 3G protocol, such that phone 24 associates with the interrogation device, rather than with network 33. In some embodiments, first antenna 40a is a directional antenna, the directionality of first antenna 40a further increasing the power of the soliciting signal as received by the phone.

While the solicited phone is associated with interrogation device 20, at a first instructing step 52, processor 48 instructs phone 24, via the transceiver and antenna, to use a second communication protocol, instead of the communication protocol that the phone was previously using. For example, the processor may instruct the phone, via first transceiver 44_1, to communicate with second transceiver 44_2 using a 2G communication protocol, such as GSM, instead of continuing to communicate with first transceiver 44_1 using the original 3G communication protocol. Typically, the processor instructs the phone in accordance with an inter-Radio Access Technology (inter-RAT) handover protocol.

Upon the phone switching to the second communication protocol, the processor instructs one of the modems to clone the phone, using an identifier of the phone. Suitable identifiers for cloning include an International Mobile Subscriber Identity (IMSI) of the phone, a Temporary Mobile Subscriber Identity (TMSI) assigned to the phone, a Mobile Station International Subscriber Directory Number (MSISDN) of the phone, an Internet Protocol (IP) or Medium Access Protocol (MAC) address, or any other suitable identifier. Subsequently, at a registering step 53, the processor registers the phone on second network 32. Following the registration, the second network communicates with the cloning modem as if the modem were the phone.

As noted above, were the interrogation device to leave the phone on the second communication protocol, the user might notice that the communication protocol has changed. For example, some phones display an indicator that indicates the "family" of communication protocols that is currently being used by the phone, such as a "2G" icon. Were the interrogation device to leave the phone on the second communication protocol, the user might notice the "2G" icon.

Hence, at a second instructing step 54, the processor instructs the phone to again use the first communication protocol. For example, the processor may instruct the phone via second transceiver 44_2, using the 2G protocol, to switch back to the 3G protocol (and re-associate with first transceiver 44_1). Again, such instruction may be in accordance with an inter-Radio Access Technology (inter-RAT) handover protocol.

Subsequently, the processor waits for a request to exchange communication with the phone. Upon detecting such a request at a detecting step 55, the processor instructs the phone at a third instructing step 56, in response to the request, to use the second communication protocol for the exchange. (The manner in which third instructing step 56 is carried out may be similar, or identical, to the manner in which first instructing step 52 is carried out.) Subsequently, at an intermediating step 58, the processor intermediates the exchange, as described hereinabove.

In some cases, the processor may detect the request for the exchange of communication by detecting a request that is made by the phone. For example, first transceiver 44_1, which uses a 3G protocol, may receive a connection request from the phone. The processor may then detect the request, by receiving the request from the first transceiver. In response thereto, the processor may instruct the phone, via first transceiver 44_1, to switch to a 2G protocol.

In other cases, the processor may detect the request for the exchange of communication by detecting a request that is made by another communication terminal. For example, the modem that is behaving as a clone of the phone may receive, from the second network, a paging request on a broadcast channel, the paging request indicating that another communication terminal is requesting to exchange communication with the phone. The processor may then detect the request, by receiving the paging request from the modem. In response thereto, the processor may instruct the phone, via first transceiver 44_1, to switch to a 2G protocol.

Since the processor switches the phone to the second communication protocol only after detecting the request for the exchange, the user is unlikely to notice the change in communication protocol, at least for the following reasons:

(i) Following a request for outgoing communication (e.g., following the pressing of the "dial" button by the user), the user is likely to be holding the phone at his ear, such that he is unlikely to see the change in the indicator displayed by the phone.

(ii) Some phones do not change the indicator mid-exchange; hence, for example, even after the phone has switched to 2G, the "3G" icon may continue to show.

Typically, the phone continues to use the second communication protocol for the duration of the exchange. Subsequently, the processor may instruct the phone, via the appropriate transceiver and antenna, to re-associate with the first mobile communication network.

Certain elements of interrogation device 20 can be implemented using hardware, such as using one or more Application-Specific Integrated Circuits (ASICs), Field-Programmable Gate Arrays (FPGAs), Digital Signal Processors (DSPs) or other device types. Additionally or alternatively, certain elements of device 20 can be implemented using software, or using a combination of hardware and software elements. In some embodiments, processor 48 comprises one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

It is noted that embodiments described herein may be used with any relevant type of exchanged communication, including voice communication, text messages, and data communication.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
    soliciting a mobile communication terminal, which is associated with a first mobile communication network in accordance with a first communication protocol, to associate with an interrogation device; and
    while the solicited mobile communication terminal is associated with the interrogation device:
        instructing the mobile communication terminal to use a second communication protocol, subsequently, registering the mobile communication terminal on a second mobile communication network that uses the second communication protocol, subsequently, instructing the mobile communication terminal to again use the first communication protocol, subsequently, by virtue of having registered the mobile communication terminal on the second communication network, detecting a request for an exchange of second-communication-protocol communication with the mobile communication terminal, in response thereto, instructing the mobile communication terminal to use the second communication protocol for the exchange, and subsequently, intermediating the exchange.

2. The method according to claim 1, wherein intermediating the exchange comprises decrypting the exchange.

3. The method according to claim 1, further comprising, following the intermediating of the exchange, instructing the mobile communication terminal to re-associate with the first mobile communication network.

4. The method according to claim 1, wherein instructing the mobile communication terminal to use the second communication protocol comprises instructing the mobile communication terminal to use a second generation (2G) communication protocol.

5. The method according to claim 1, wherein detecting the request for the exchange of communication comprises detecting a request that is made by the mobile communication terminal.

6. The method according to claim 1, wherein detecting the request for the exchange of communication comprises detecting a request that is made by a communication terminal that is not the mobile communication terminal.

7. An interrogation device, comprising:
an antenna;
at least one transmitter-receiver (transceiver); and
a processor, configured to:
via the transceiver and the antenna, solicit a mobile communication terminal, which is associated with a first mobile communication network in accordance with a first communication protocol, to associate with the interrogation device via the transceiver and the antenna, and
while the solicited mobile communication terminal is associated with the interrogation device:
instruct the mobile communication terminal to use a second communication protocol,
subsequently, register the mobile communication terminal on a second mobile communication network that uses the second communication protocol,
subsequently, instruct the mobile communication terminal to again use the first communication protocol,
subsequently, by virtue of having registered the mobile communication terminal on the second mobile communication network, detect a request for
an exchange of second-communication-protocol communication with the mobile communication terminal,
in response thereto, instruct the mobile communication terminal to use the second communication protocol for the exchange, and
subsequently, intermediate the exchange.

8. The interrogation device according to claim 7, wherein the processor is configured to decrypt the exchange while intermediating the exchange.

9. The interrogation device according to claim 7, wherein the processor is further configured to, following the intermediating of the exchange, instruct the mobile communication terminal to re-associate with the first mobile communication network.

10. The interrogation device according to claim 7, wherein the second communication protocol is a second generation (2G) communication protocol, the processor being configured to instruct the mobile communication terminal to use the 2G communication protocol.

11. The interrogation device according to claim 7, wherein the processor is configured to detect the request by detecting a request that is made by the mobile communication terminal.

12. The interrogation device according to claim 7, wherein the processor is configured to detect the request by detecting a request that is made by a communication terminal that is not the mobile communication terminal.

13. A computer software product comprising a tangible non-transitory computer-readable medium in which program instructions are stored, which instructions, when read by a processor of an interrogation device with which a mobile communication terminal, which was previously associated with a first mobile communication network in accordance with a first communication protocol, is associated, cause the processor to, via an antenna and a transmitter-receiver (transceiver) of the interrogation device:
instruct the mobile communication terminal to use a second communication protocol,
subsequently, register the mobile communication terminal on a second mobile communication network that uses the second communication protocol,
subsequently, instruct the mobile communication terminal to again use the first communication protocol,
subsequently, by virtue of having registered the mobile communication terminal on the second communication network, detect a request for an exchange of second-communication-protocol communication with the mobile communication terminal,
in response thereto, instruct the mobile communication terminal to use the second communication protocol for the exchange, and
subsequently, intermediate the exchange.

14. The computer software product according to claim 13, wherein the instructions further cause the processor to, prior to instructing the mobile communication terminal to use the second communication protocol, solicit the mobile communication terminal to associate with the interrogation device.

15. The computer software product according to claim 13, wherein the instructions cause the processor to, while intermediating the exchange, decrypt the exchange.

16. The computer software product according to claim 13, wherein the instructions further cause the processor to, following the intermediating of the exchange, instruct the mobile communication terminal to re-associate with the first mobile communication network.

17. The computer software product according to claim 13, wherein the instructions cause the processor to instruct the mobile communication terminal to use the second communication protocol by instructing the mobile communication terminal to use a second generation (2G) communication protocol.

18. The computer software product according to claim 13, wherein the instructions cause the processor to detect the request for the exchange of communication by detecting a request that is made by the mobile communication terminal.

19. The computer software product according to claim 13, wherein the instructions cause the processor to detect the request for the exchange of communication by detecting a request that is made by a communication terminal that is not the mobile communication terminal.

\* \* \* \* \*